US008673475B2

(12) United States Patent
Choi et al.

(10) Patent No.: US 8,673,475 B2
(45) Date of Patent: *Mar. 18, 2014

(54) MIDDLE OR LARGE-SIZED BATTERY PACK CASE PROVIDING IMPROVED DISTRIBUTION UNIFORMITY IN COOLANT FLUX

(75) Inventors: Dooseong Choi, Daejeon (KR); Ye Hoon Im, Daejeon (KR); Sang Phil Han, Daejeon (KR); Jaesung Ahn, Daejeon (KR); D. M. Kang, Daejeon (KR); Jongmoon Yoon, Daejeon (KR); Heekook Yang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/440,566

(22) Filed: Apr. 5, 2012

(65) Prior Publication Data

US 2012/0237806 A1 Sep. 20, 2012

Related U.S. Application Data

(63) Continuation of application No. 12/521,719, filed as application No. PCT/KR2007/006711 on Dec. 21, 2007, now Pat. No. 8,211,564.

(30) Foreign Application Priority Data

Dec. 30, 2006 (KR) .................. 10-2006-0139185

(51) Int. Cl.
*H01M 2/10* (2006.01)
(52) U.S. Cl.
USPC ........................................... 429/120; 429/99

(58) Field of Classification Search
USPC .................................................... 429/120, 99
See application file for complete search history.

(56) References Cited

U.S. PATENT DOCUMENTS

| 6,482,542 | B1 | 11/2002 | Takaki et al. | |
|---|---|---|---|---|
| 6,689,510 | B1 | 2/2004 | Gow et al. | |
| 2005/0142440 | A1 | 6/2005 | Yamaki et al. | |
| 2005/0153199 | A1* | 7/2005 | Yagi et al. ................ | 429/148 |
| 2006/0063067 | A1 | 3/2006 | Kim | |
| 2006/0073378 | A1 | 4/2006 | Hamery et al. | |
| 2006/0214633 | A1* | 9/2006 | Cho ........................... | 320/112 |
| 2006/0216579 | A1 | 9/2006 | Cho | |

FOREIGN PATENT DOCUMENTS

| JP | 07-320794 A | 12/1995 |
|---|---|---|
| JP | 11126585 A * | 5/1999 |

(Continued)

*Primary Examiner* — Gregg Cantelmo
(74) *Attorney, Agent, or Firm* — Birch, Stewart, Kolasch & Birch, LLP

(57) ABSTRACT

A middle- or large-sized battery pack case is provided in which a battery module having a plurality of stacked battery cells is mounted, wherein the battery pack case is provided with a coolant inlet port and a coolant outlet port, which are disposed such that a coolant for cooling the battery cells can flow from one side to the other side of the battery module in the direction perpendicular to the stacking direction of the battery cells. The battery pack case includes beads formed in a concavo-convex shape for improving the structural stability of the battery pack case against an external force, the beads being constructed in a structure in which the beads do not disturb the flow of the coolant from the coolant inlet port along the advancing direction of a fluid in a flow space defined between the coolant inlet port and the battery module.

12 Claims, 3 Drawing Sheets

(56) References Cited

FOREIGN PATENT DOCUMENTS

| | | | |
|---|---|---|---|
| JP | 2000-067934 A | | 3/2000 |
| JP | 2000133225 A | * | 5/2000 |
| JP | 2000-243461 A | | 9/2000 |
| JP | 2005-005167 A | | 1/2005 |
| JP | 2005-116342 A | | 4/2005 |
| JP | 2005-302590 A | | 10/2005 |
| JP | 2005-310461 A | | 11/2005 |
| JP | 2006-128123 A | | 5/2006 |
| JP | 2006-156382 A | | 6/2006 |

* cited by examiner

<Flux distribution in channel between cells>

<Flux distribution in channel between cells>

<Flux distribution in channel between cells>

MIDDLE OR LARGE-SIZED BATTERY PACK CASE PROVIDING IMPROVED DISTRIBUTION UNIFORMITY IN COOLANT FLUX

CROSS-REFERENCE TO RELATED APPLICATIONS

This application is a Continuation of application Ser. No. 12/521,719 filed on Oct. 1, 2009, now U.S. Pat. No. 8,211,564, which is a National Stage of International Patent Application No. PCT/KR2007/006711, filed Dec. 21, 2007, which claims priority to Korean Application No. 10-2006-0139185, filed on Dec. 30, 2006. The entire contents of all of the above applications are hereby expressly incorporated by reference.

FIELD OF THE INVENTION

The present invention relates to a middle- or large-sized battery pack case providing improved distribution uniformity in coolant flux, and, more particularly, to a middle- or large-sized battery pack case in which a battery module having a plurality of stacked battery cells, which can be charged and discharged, is mounted, wherein the battery pack case is provided with a coolant inlet port and a coolant outlet port, which are disposed such that a coolant for cooling the battery cells can flow from one side to the other side of the battery module in the direction perpendicular to the stacking direction of the battery cells, and the battery pack case is further provided with beads formed in a concavo-convex shape for improving the structural stability of the battery pack case against an external force, the beads being constructed in a structure in which the beads do not disturb the flow of the coolant from the coolant inlet port along the advancing direction of a fluid in a flow space defined between the coolant inlet port and the battery module.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery module having a plurality of battery cells electrically connected with each other because high power and large capacity are necessary for the middle- or large-sized devices.

Preferably, the middle- or large-sized battery module is manufactured with small size and weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

For the middle- or large-sized battery module to provide power and capacity required by a predetermined apparatus or device, it is necessary for the middle- or large-sized battery module to be constructed in a structure in which a plurality of battery cells are electrically connected in series with each other, and the battery cells are stable against an external force.

Also, the battery cells constituting the middle- or large-sized battery module are secondary batteries which can be charged and discharged. Consequently, a large amount of heat is generated from the high-power, large-capacity secondary battery during the charge and discharge of the battery cells. If the heat, generated from the unit cells during the charge and discharge of the unit cells, is not effectively removed, the heat accumulates in the respective unit cells, and therefore, the deterioration of the unit cells is accelerated. According to circumstances, the unit cells may catch fire or explode. For this reason, a cooling system is needed in a battery pack for vehicles, which is a high-power, large-capacity battery.

An example of the battery pack cooling system is illustrated in FIG. 1.

Referring to FIG. 1, the battery pack cooling system includes a battery module 20 constructed in a structure in which a plurality of battery cells 21 are electrically connected with each other and a battery pack case 10 in which the battery module 20 is mounted. At the battery pack case 10 are formed a coolant inlet port and a coolant outlet port, which are disposed such that a coolant can flow from one side to the other side of the battery module 20 in the direction perpendicular to the stacking direction of the battery cells 21. At the battery pack case 10 are also formed beads 11, by which the battery pack case 10 exhibits excellent durability or structural stability against an external force, such as twist or vibration. The shape of the beads 11 is clearly shown in FIG. 2, which is a partial perspective view illustrating the external appearance of the battery pack case 10.

As shown in FIG. 2, each bead 11 is constructed in a concavo-convex structure having a large length (L) to width (W) ratio. The beads 11 are arranged parallel to each other.

Referring back to FIG. 1, small gaps are defined between the respective battery cells 21 of the battery module 20 such that a coolant can flow through the gaps. Consequently, the coolant, introduced through the coolant inlet port, flows through the gaps. At this time, heat generated from the battery cells 21 is removed by the coolant. After that, the coolant is discharged through the coolant outlet port.

However, the flow of the coolant, introduced through the coolant inlet port, is greatly disturbed by the beads 11 formed at the battery pack case adjacent to the coolant inlet port. As a result, it is difficult to accomplish uniform coolant flux distribution to the battery cells 21. Specifically, the width of an upper duct 12 is temporarily reduced at the positions where the beads 11 are located. As a result, the flux of the coolant flowing through the channel defined between the battery cells 21 located below the beads 11 is considerably reduced, and therefore, the coolant is driven to the front of the beads 11.

FIG. 3 is a graph illustrating the measurement results of coolant flux distribution between battery cells of the middle- or large-sized battery pack manufactured in the structure shown in FIG. 1. It can be seen from the graph of FIG. 3 that the flux of the coolant between the battery cells at the positions where the beads of the battery pack case are located is considerably reduced.

Eventually, the coolant is not uniformly supplied to the respective battery cells 21, and therefore, the temperature difference between the battery cells 21 is greatly increased. Such great temperature difference is one of the main causes greatly lowering the overall performance of the battery pack.

As a technology for improving a problem caused by the nonuniform distribution of a coolant, a technology for changing the flow direction of the coolant by a plurality of rectification plates installed in a coolant channel is disclosed in Japanese Patent Application Publication No. 2005-116342. However, this technology has a problem in that a process for installing the rectification plates is added to a conventional manufacturing process, and therefore, the manufacturing costs are increased. Furthermore, the disclosed technology has another problem in that the flow of the coolant in the battery pack is disturbed by the rectification plates, and therefore, the average remaining time, for which the coolant, introduced through the coolant inlet port, is discharged through the coolant outlet port, increases, whereby the cooling effect deteriorates.

Consequently, there is a high necessity for a technology to fundamentally solve the above-mentioned problems.

SUMMARY OF THE INVENTION

Therefore, the present invention has been made to solve the above problems, and other technical problems that have yet to be resolved.

As a result of a variety of extensive and intensive studies and experiments on a middle- or large-sized battery pack case, the inventors of the present invention have found that, when the structure of beads formed at the battery pack case is improved, the distribution uniformity of coolant flux is improved while the decrease of its structural stability against an external force is minimized, with the result that heat accumulated between battery cells is effectively removed, and therefore, the performance and life span of the battery cells are greatly improved. The present invention has been completed based on these findings.

In accordance with one aspect of the present invention, the above and other objects can be accomplished by the provision of a middle- or large-sized battery pack case in which a battery module having a plurality of stacked battery cells, which can be charged and discharged, is mounted, wherein the battery pack case is provided with a coolant inlet port and a coolant outlet port, which are disposed such that a coolant for cooling the battery cells can flow from one side to the other side of the battery module in the direction perpendicular to the stacking direction of the battery cells, and the battery pack case is further provided with beads formed in a concavo-convex shape for improving the structural stability of the battery pack case against an external force, the beads being constructed in a structure in which the beads do not disturb the flow of the coolant from the coolant inlet port along the advancing direction of a fluid in a flow space ("inlet duct") defined between the coolant inlet port and the battery module.

Consequently, the middle- or large-sized battery pack case according to the present invention is capable of effectively removing heat generated during the charge and discharge of the battery cells through the uniform flow of the coolant, without disturbing the flow of the coolant, introduced into the battery pack case through the coolant inlet port, while effectively complementing the mechanical strength of the battery pack case by the bead structure, thereby improving the cooling efficiency and the performance of the battery.

The battery module, mounted in the middle- or large-sized battery pack case according to the present invention, is generally manufactured by a method of stacking a plurality of battery cells with high integration. At this time, the neighboring battery cells are spaced apart from each other at regular intervals such that heat generated during the charge and discharge of the battery cells can be removed. For example, the battery cells may be sequentially stacked such that the battery cells are spaced apart from each other at predetermined intervals. When the battery cells have a low mechanical strength, one or several battery cells are mounted in a cartridge, and a plurality of cartridges are stacked to constitute a battery module. Consequently, a coolant channel is defined between the respective battery cells such that heat accumulated between the stacked battery cells is effectively removed.

The beads are formed at the battery pack case such that the beads exhibit excellent durability or structural stability against an external force, such as twist or vibration. In a preferred embodiment, the beads are constructed in a concavo-convex structure having a large length to width ratio, and the beads are arranged parallel to each other.

Preferably, the beads have an inward height of 2 to 5 mm or equivalent to 10 to 30% of the vertical sectional height of the coolant inlet port such that the beads do not greatly disturb the flow of the coolant while securing durability and structural stability. If the inward height of the beads is too small, the durability and the structural stability are greatly reduced against an external force, such as twist or the vibration. If the inward height of the beads is too large, on the other hand, the beads greatly disturb the flow of the coolant, and therefore, the cooing efficiency of the battery pack is lowered. More preferably, the beads have an inward height of 3 to 4 mm or equivalent to 15 to 25% of the vertical sectional height of the coolant inlet port.

In a preferred embodiment in connection with the bead structure that does not disturb the flow of the coolant, the battery pack case is constructed in a structure in which the length of the battery pack case in the stacking direction of the battery cells is greater than the length of the battery pack case in the lateral direction of the battery cells, the beads are arranged parallel to the lateral direction of the battery cells, and the beads are not formed at a predetermined region of the inlet duct adjacent to the coolant inlet port.

The bead structure is a structure in which the beads are not substantially formed at the region of the inlet duct adjacent to the coolant inlet port. The influence of the beads on the flow of the coolant is the greatest at the region of the inlet duct adjacent to the coolant inlet port. Consequently, when the beads are formed from a region of the inlet duct spaced a predetermined distance from the coolant inlet port, the influence of the beads on the flow of the coolant is minimized.

Preferably, the region where the beads are not formed has a length equivalent to 10 to 30% of the total length of the inlet duct. If the length of the region where the beads are not formed is too small, the influence of the beads on the flow of the coolant is increased, and therefore, it is difficult to achieve a desired effect. If the length of the region where the beads are not formed is too large, on the other hand, the durability and the structural stability of the region where the beads are not formed are reduced. More preferably, the region where the beads are not formed has a length equivalent to 15 to 25% of the total length of the inlet duct.

In another preferred embodiment, the battery pack case is constructed in a structure in which the length of the battery pack case in the stacking direction of the battery cells is greater than the length of the battery pack case in the lateral direction of the battery cells, the beads are formed at the battery pack case such that the beads are arranged parallel to the lateral direction of the battery cells, and the inward height of the beads at a predetermined region of the inlet duct adjacent to the coolant inlet port is gradually decreased toward the coolant inlet port.

This structure includes a structure in which the inward height of the bead at the coolant inlet port side is relatively decreased, and the inward height of the beads is gradually increased as the beads become more distant from the coolant inlet port, or the inward height of the beads is gradually increased to a predetermined value, and then the original inward height of the beads is maintained from a next specific bead, in order to minimize the decrease of the structural stability of the battery pack case and, at the same time, increase the distribution uniformity of coolant flux between the battery cells. In this case, the number of the beads the inward height of which is changed may be decided depending upon the degree of decrease of the structural strength of the battery pack case due to the height adjustment of the beads.

Preferably, the region where the inward height of the beads is gradually decreased has a length equivalent to 15 to 50% of the total length of the inlet duct. If the length of the region where the inward height of the beads is gradually decreased is too small, the height of the beads is increased with a relatively large width in a narrow space, and therefore, it is difficult to achieve a desired effect. If the length of the region where the inward height of the beads is gradually decreased is too large, on the other hand, the durability and the structural stability of the region where the inward height of the beads is gradually decreased are decreased over a wide range. More preferably, the region where the inward height of the beads is gradually decreased has a length equivalent to 20 to 40% of the total length of the inlet duct.

In a further embodiment, the battery pack case is constructed in a structure in which the length of the battery pack case in the stacking direction of the battery cells is greater than the length of the battery pack case in the lateral direction of the battery cells, and the beads are formed at the battery pack case such that the beads are arranged perpendicular to the lateral direction of the battery cells and, at the same time, parallel to the direction in which the coolant inlet port is disposed.

In the above-described structure, the beads are arranged parallel to the direction in which the coolant inlet port is disposed, and the battery cells are also arranged parallel to the direction in which the coolant inlet port is disposed. As a result, the coolant, introduced through the coolant inlet port, flows along the beads in parallel to the direction in which the coolant is introduced, and therefore, is introduced into the coolant channel defined between the battery cells. Consequently, the influence of the beads on the flow of the coolant is minimized.

Preferably, the battery pack case is constructed in a structure in which a suction fan is mounted in the coolant outlet port for rapidly and smoothly moving the coolant, introduced through the coolant inlet port, to the coolant outlet port, such that the coolant is discharged out of the battery pack, after the coolant flows through the battery module.

In a preferred embodiment, the coolant inlet port has a vertical sectional area less than that of the coolant outlet port. It has been proved that the coolant, introduced through the narrow coolant inlet port, sufficiently reached the battery cells far away from the coolant inlet port by the rapid flow speed of the coolant, and therefore, relatively uniform distribution of the coolant flux was achieved in the condition of the same coolant flux.

Preferably, the coolant inlet port has a vertical sectional area equivalent to 50 to 90% of the vertical sectional area of the coolant outlet port. If the vertical sectional area of the coolant inlet port is less than the above-mentioned range, the energy consumption for the flow of the coolant is greatly increased. If the vertical sectional area of the coolant inlet port is greater than the above-mentioned range, on the other hand, it is difficult to achieve the uniform distribution of the coolant flux, as previously described. More preferably, the coolant inlet port has a vertical sectional area equivalent to 55 to 85% of the vertical sectional area of the coolant outlet port.

According to circumstances, the battery pack case may be constructed in a structure in which a flow space ("outlet duct") defined between the coolant outlet port and the battery module is gradually widened toward the coolant outlet port. The coolant, having flowed through the battery module, is collected in the outlet duct. Consequently, it is possible to improve the easiness of the coolant discharge by reducing the size of the outlet duct at a region far away from the coolant outlet port.

In accordance with another aspect of the present invention, there is provided a middle- or large-sized battery pack constructed in a structure in which a battery module is mounted in the middle- or large-sized battery pack case with the above-stated construction.

The term "battery module" used in the specification inclusively means the structure of a battery system constructed in a structure in which two or more chargeable and dischargeable battery cells are mechanically and, at the same time, electrically connected with each other to provide high-power, large-capacity electricity. Therefore, the battery module itself may constitute a single apparatus or a part of the large-sized apparatus. For example, a plurality of small-sized battery modules are connected with each other to constitute a large-sized battery module.

The battery module may include a plurality of plate-shaped battery cells that can be charged and discharged. In the specification, the term 'plate shape' means the shape of a rectangular parallelepiped having a relatively large length to width ratio.

The battery cells may be secondary batteries, such as nickel metal hydride secondary batteries or lithium secondary batteries. Among them, the lithium secondary batteries are preferably used because the lithium secondary batteries have high energy density and discharge voltage. Based on its shape, a prismatic battery or a pouch-shaped battery is preferably used as a chargeable and dischargeable unit body constituting the battery module. More preferably, the pouch-shaped battery is used as the unit body of the battery module.

The middle- or large-sized battery pack according to the present invention is preferably used as a power source for electric vehicles or hybrid electric vehicles, the safety of which may seriously deteriorate by high-temperature heat generated from a plurality of battery cells combined to provide high power and large capacity, during the charge and discharge of the battery cells.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 4:
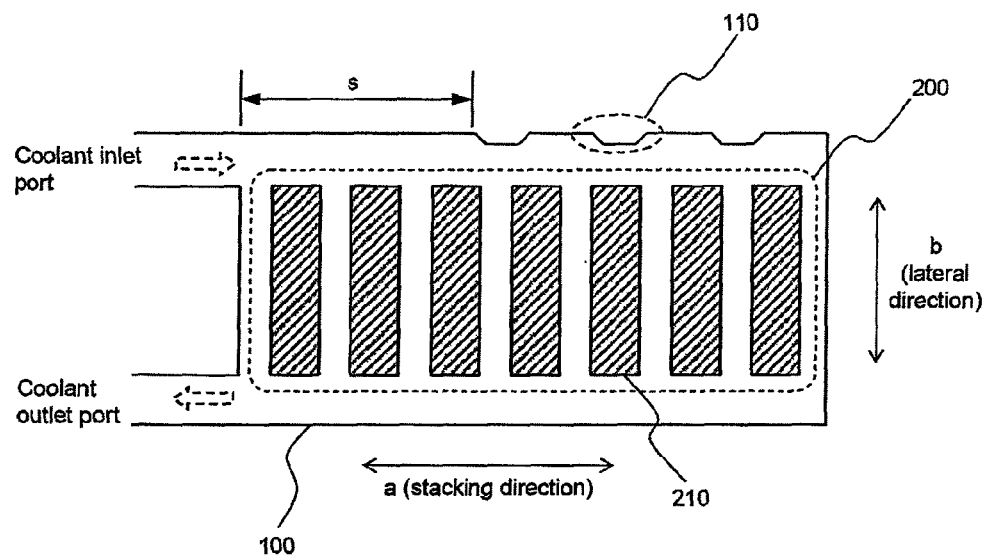
FIG. 4 is a sectional view typically illustrating a middle- or large-sized battery pack constructed in a structure in which a battery module is mounted in a battery pack case according to a preferred embodiment of the present invention.

FIG. 4 is a sectional view typically illustrating a middle- or large-sized battery pack constructed in a structure in which a battery module is mounted in a battery pack case according to a preferred embodiment of the present invention.

Referring to FIG. 4, the middle- or large-sized battery pack includes a battery module 200 constructed in a structure in which a plurality of plate-shaped battery cells 210 are electrically and mechanically connected with each other and a battery pack case 100 in which the battery module 200 is mounted.

The battery pack case 100 is constructed in a structure in which the length of the battery pack case 100 in the stacking direction a of the battery cells 210 is greater than the length of the battery pack case 100 in the lateral direction b of the battery cells 210. The battery pack case 100 has a coolant inlet port and a coolant outlet port, which are disposed such that a coolant can flow from one side to the other side of the battery module 200 in the direction perpendicular to the stacking direction of the battery cells.

Small gaps are defined between the respective battery cells 210 of the battery module 200 such that the coolant can flow through the gaps. Consequently, the coolant, introduced through the coolant inlet port, flows through the gaps. At this time, heat generated from the battery cells 210 is removed by the coolant. After that, the coolant is discharged through the coolant outlet port.

Figure 1:
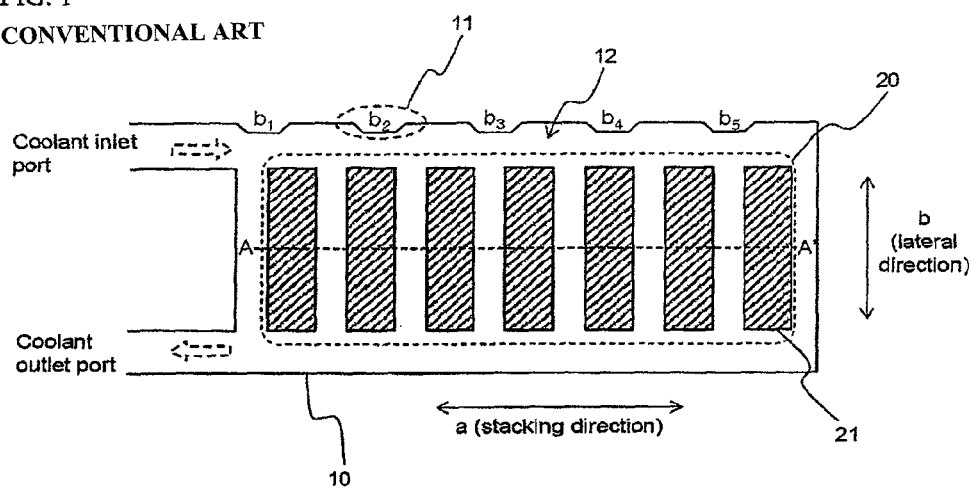
FIG. 1 is a sectional view typically illustrating a middle- or large-sized battery pack constructed in a structure in which a battery module is mounted in a conventional battery pack case having beads.
Figure 2:
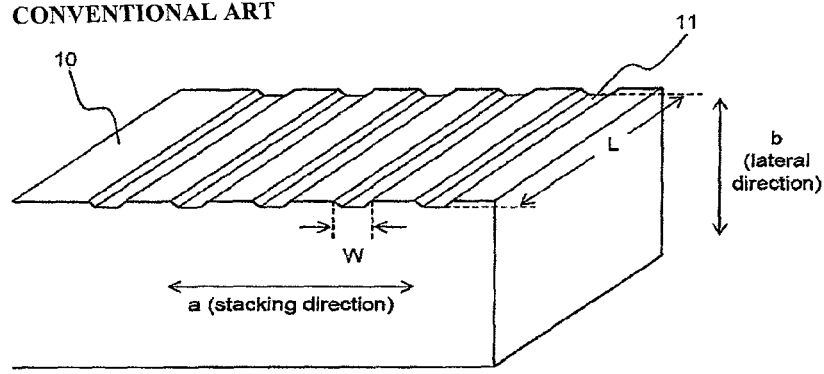
FIG. 2 is a perspective view illustrating the external appearance of the battery pack case of the middle- or large-sized battery pack shown in FIG. 1.
Figure 3:
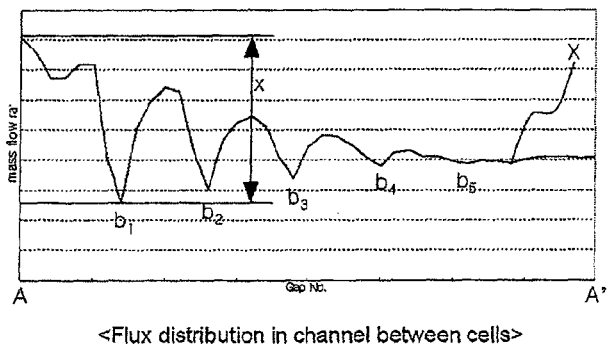
FIG. 3 is a graph illustrating the measurement results of coolant flux distribution between battery cells of the middle- or large-sized battery pack manufactured in the structure shown in FIG. 1.

The battery pack case 100 according to this embodiment is different from the battery pack case 10 illustrated in FIG. 1 in that beads 110 are not formed at a predetermined region s of the battery pack case 100 adjacent to the coolant inlet port. Since the beads 110 are not formed at the region s of the battery pack case 100, the distribution uniformity of coolant flux is further improved.

Figure 5:
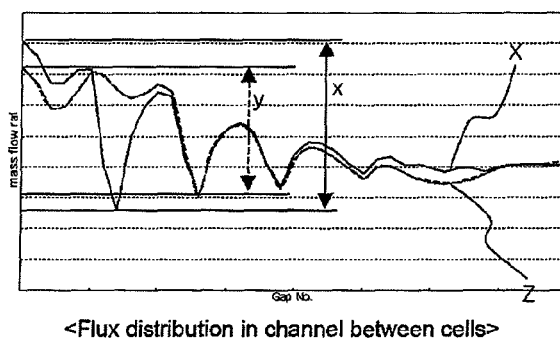
FIG. 5 is a graph illustrating the measurement results of coolant flux distribution between battery cells of the middle- or large-sized battery pack manufactured in the structure shown in FIG. 4.

In this connection, FIG. 5 illustrates the measurement results of coolant flux distribution between battery cells of the middle- or large-sized battery pack manufactured in the structure shown in FIG. 4. Specifically, both the measurement results X of coolant flux distribution in the middle- or large-sized battery pack of FIG. 1 and the measurement results Y of coolant flux distribution in the middle- or large-sized battery pack of FIG. 4 are illustrated in FIG. 5.

When comparing the coolant flux difference y of the Y with the coolant flux difference x of the X, the flow of the coolant at the battery cells adjacent to the coolant inlet port is not disturbed by the beads, whereby the coolant flux difference y of the Y is less than the coolant flux difference x of the X, and therefore, the distribution uniformity of coolant flux is improved.

Figure 6:
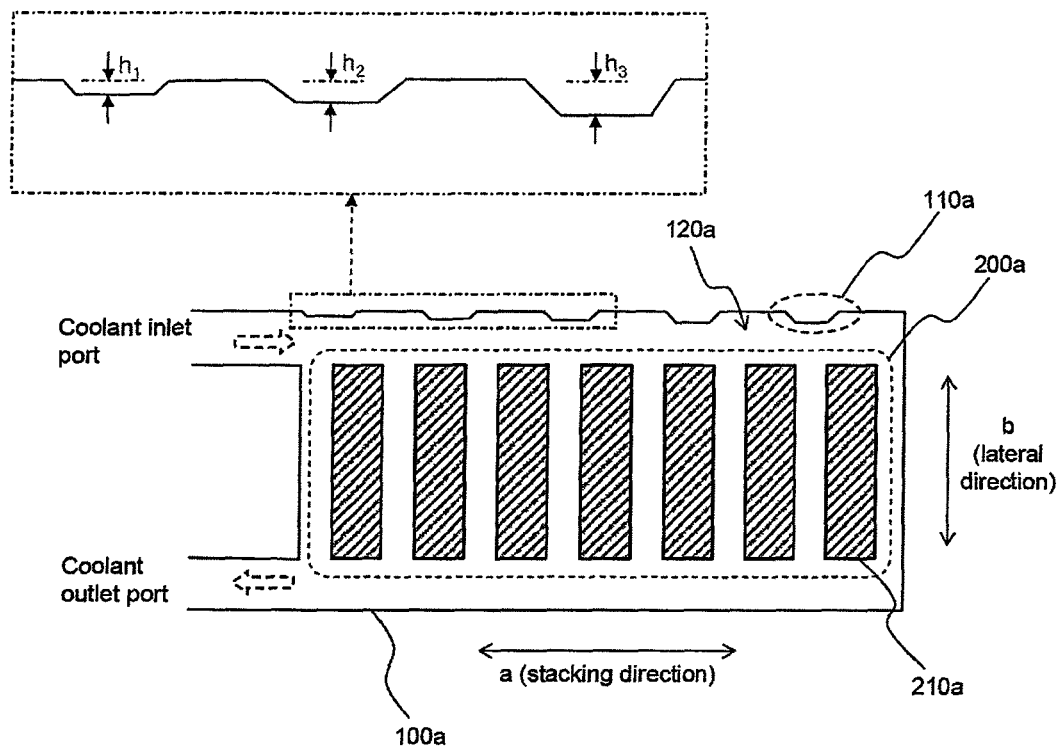
FIG. 6 is a sectional view typically illustrating a middle- or large-sized battery pack constructed in a structure in which a battery module is mounted in a battery pack case according to another preferred embodiment of the present invention.

FIG. 6 is a sectional view typically illustrating a middle- or large-sized battery pack constructed in a structure in which a battery module is mounted in a battery pack case according to another preferred embodiment of the present invention.

Referring to FIG. 6, the battery pack case 100a is constructed in a structure in which the length of the battery pack case 100a in the stacking direction a of the battery cells is greater than the length of the battery pack case 100a in the lateral direction b of the battery cells, beads 110a are formed at the battery pack case 100a such that the beads 110a are arranged parallel to the lateral direction b of the battery cells, and the inward height of the beads 110a at a predetermined region of an inlet duct 120a adjacent to the coolant inlet port is gradually decreased toward the coolant inlet port ($h_1 < h_2 < h_3$). This bead structure further improves the distribution uniformity of coolant flux.

Figure 7:
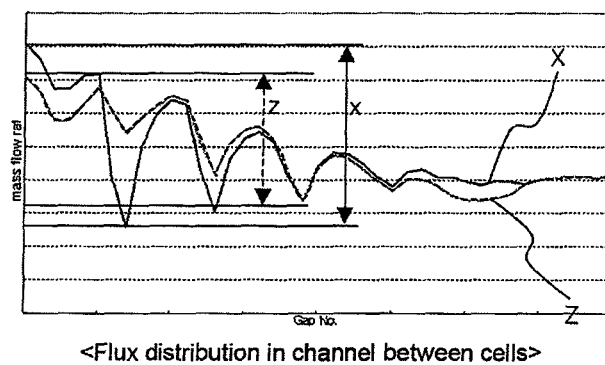
FIG. 7 is a graph illustrating the measurement results of coolant flux distribution between battery cells of the middle- or large-sized battery pack manufactured in the structure shown in FIG. 6.

In this connection, FIG. 7 illustrates the measurement results of coolant flux distribution between battery cells of the middle- or large-sized battery pack manufactured in the structure shown in FIG. 6. Specifically, both the measurement results X of coolant flux distribution in the middle- or large-sized battery pack of FIG. 1 and the measurement results Z of coolant flux distribution in the middle- or large-sized battery pack of FIG. 6 are illustrated in FIG. 7.

When comparing the coolant flux difference z of the Z with the coolant flux difference x of the X, the disturbance of the flow of the coolant at the battery cells adjacent to the coolant inlet port due to the beads is reduced by the bead structure in which the inward height of the beads is gradually decreased toward the coolant inlet port, at the coolant inlet port region where the pressure of the coolant is relatively high, whereby the coolant flux difference z of the Z is less than the coolant flux difference x of the X, and therefore, the distribution uniformity of coolant flux is improved by the structure of the battery pack case shown in FIG. 6.

The coolant flux difference y of the Y shown in FIG. 5 and the coolant flux difference z of the Z shown in FIG. 7 reveal that the coolant flux difference is greater at the position near the coolant inlet port than at the position far from the coolant inlet port. Consequently, it is possible to further decrease the range of fluctuation between the coolant flux differences depending upon the distance difference by decreasing the sectional area of the coolant inlet port such that the sectional area of the coolant inlet port is less than that of the coolant outlet port, as previously described.

Industrial Applicability

As apparent from the above description, the middle- or large-sized battery pack case according to the present invention is capable of improving the distribution uniformity of coolant flux while minimizing the decrease of its structural stability against an external force. Consequently, the middle- or large-sized battery pack case according to the present invention has the effect of effectively removing heat accumulated between the battery cells, and therefore, greatly improving the performance and life span of the battery cells.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A middle- or large-sized battery pack case in which a battery module having a plurality of stacked battery cells, which can be charged and discharged, is mounted, wherein the battery pack case is constructed in a structure in which the length of the battery pack case in a stacking direction of the battery cells is greater than the length of the battery pack case in a lateral direction of the battery cells, the battery pack case is provided with a coolant inlet port and a coolant outlet port, which are disposed such that a coolant for cooling the battery cells can flow from one side to the other side of the battery module in a direction perpendicular to the stacking direction of the battery cells, the coolant inlet port being disposed in a direction parallel to the stacking direction of the battery cells, the battery pack case is further provided with beads formed in a concavo-convex shape for improving the structural stability of the battery pack case against an external force, the beads being arranged parallel to the lateral direction of the battery cells, and the beads are not formed at a predetermined region of an inlet duct adjacent to the coolant inlet port, the inlet duct is a space defined between the coolant inlet port and the battery module, and the region where the beads are not formed has a length equivalent to 10 to 30% of the total length of the inlet duct.

2. The middle- or large-sized battery pack case according to claim 1, wherein the beads are constructed in a concavo-convex structure having a large length to width ratio, and the beads are arranged parallel to each other.

3. The middle- or large-sized battery pack case according to claim 1, wherein the beads have an inward height of 2 to 5 mm or equivalent to 10 to 30% of the vertical sectional height of the coolant inlet port.

4. The middle- or large-sized battery pack case according to claim 1, wherein the beads have an inward height of 3 to 4 mm or equivalent to 15 to 25% of the vertical sectional height of the coolant inlet port.

5. The middle- or large-sized battery pack case according to claim 1, wherein the battery pack case is constructed in a structure in which a suction fan is mounted in the coolant outlet port for forcibly moving the coolant, introduced through the coolant inlet port, to the coolant outlet port, after the coolant flows through the battery module.

6. The middle- or large-sized battery pack case according to claim 5, wherein the coolant inlet port has a vertical sectional area equivalent to 50 to 90% of the vertical sectional area of the coolant outlet port.

7. A middle- or large-sized battery pack constructed in a structure in which a battery module is mounted in a middle- or large-sized battery pack case according to claim 1.

8. The middle- or large-sized battery pack according to claim 7, wherein the battery module includes a plurality of plate-shaped battery cells that can be charged and discharged.

9. The middle- or large-sized battery pack according to claim 8, wherein the battery cells are lithium secondary batteries.

10. The middle- or large-sized battery pack according to claim 7, wherein the battery pack is used as a power source for electric vehicles or hybrid electric vehicles.

11. The middle- or large-sized battery pack case according to claim 1, wherein more than one battery cell is present in said region where beads are not formed.

12. The middle- or large-sized battery pack case according to claim 1, wherein the coolant inlet port and the coolant outlet port are located at a same side of the battery pack case.

* * * * *